Oct. 12, 1954          J. A. ALBERT          2,691,280

REFRIGERATION SYSTEM AND DRYING MEANS THEREFOR

Filed Aug. 4, 1952          3 Sheets—Sheet 1

James A. Albert
INVENTOR

BY *Hyman T. Glass*
ATTORNEY

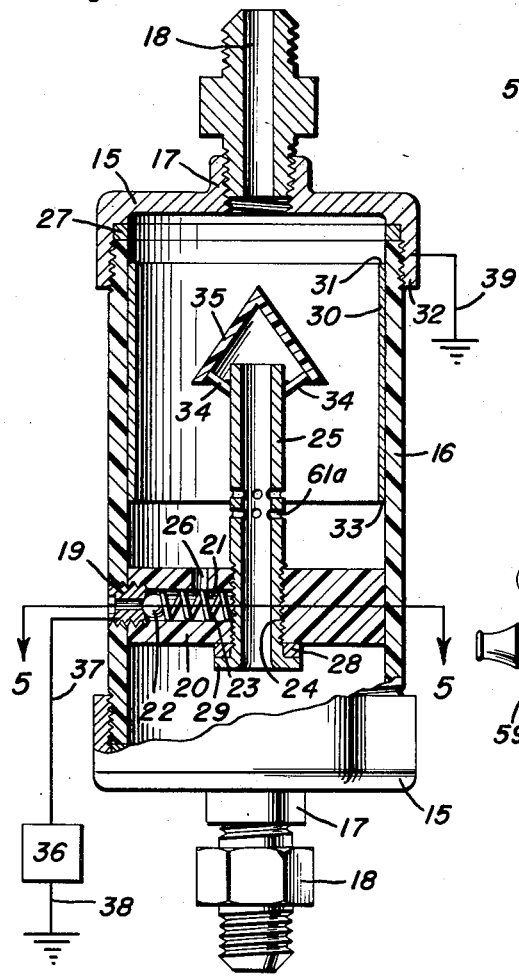
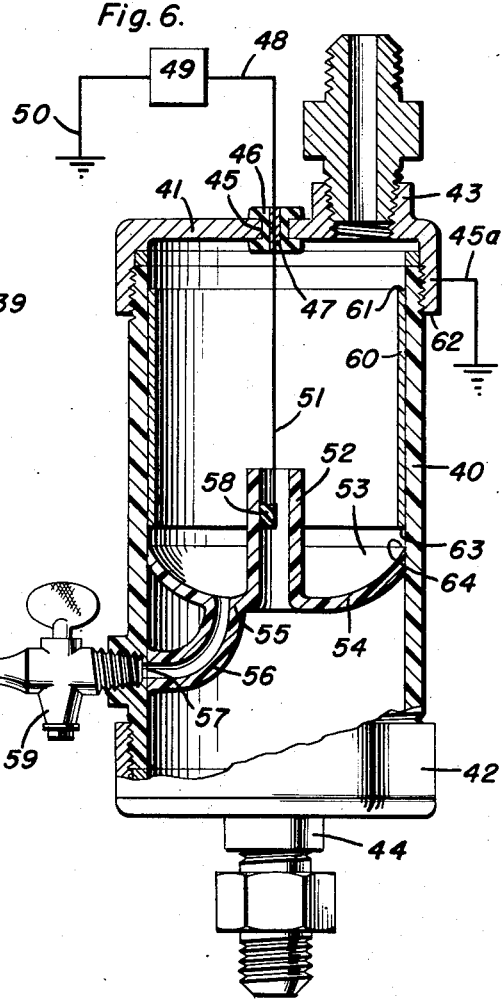
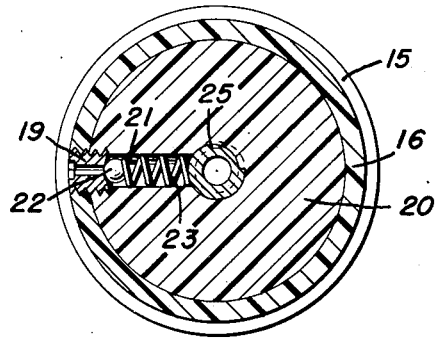
James A. Albert
INVENTOR

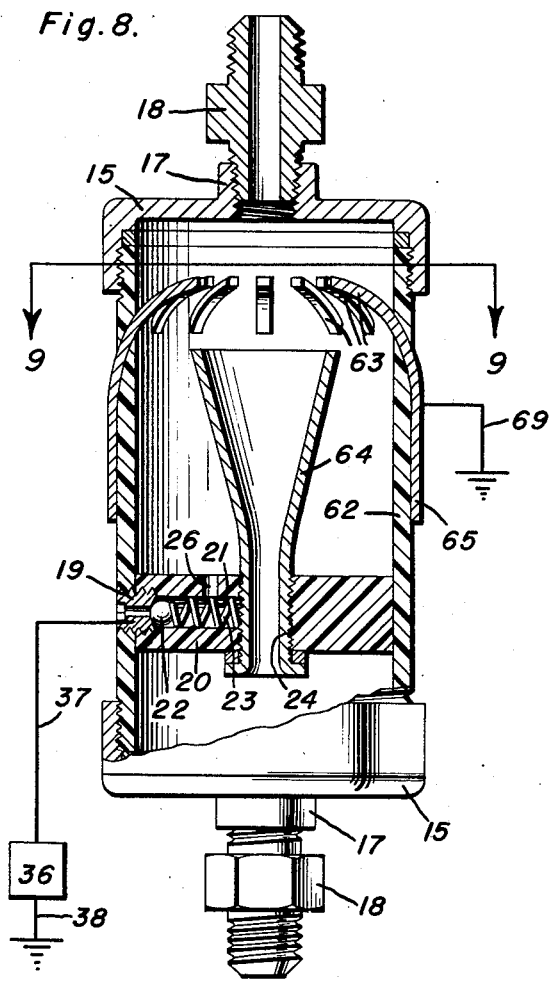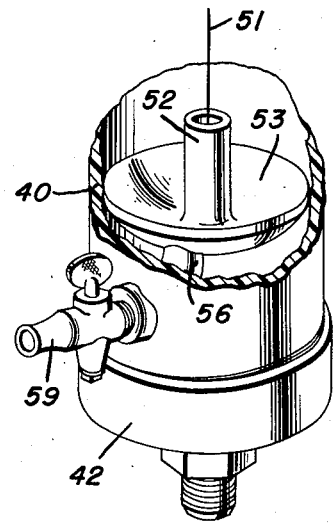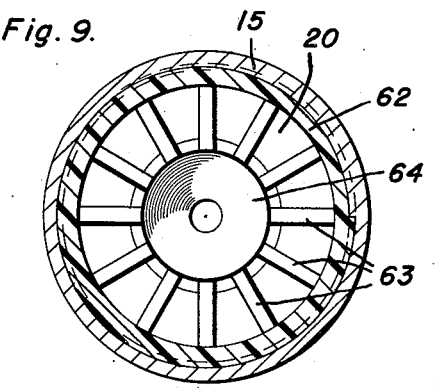

Patented Oct. 12, 1954

2,691,280

UNITED STATES PATENT OFFICE 2,691,280

REFRIGERATION SYSTEM AND DRYING MEANS THEREFOR

James A. Albert, Pittsburgh, Pa.

Application August 4, 1952, Serial No. 302,504

4 Claims. (Cl. 62—117.85)

This invention relates to refrigerating systems and dehydration means of the electrical precipitation type to be used therein, said dehydrating means being capable of permanent installation in said systems.

The most common refrigerant fluids utilized in refrigeration systems comprising a compressor, a condenser, a refrigerant expansion device, and an evaporator connected in a closed circuit are Freon–12 and methyl chloride, neither of which is miscible with water and each of which is heavier than water. Sulfur dioxide is used to some extent. The dehydrators presently used in all refrigeration systems are of the chemical type, such as silica gel and activated alumina and are known in the art as "solid chemical drying agents." These drying agents are placed in a container having suitable fittings at the ends thereof to facilitate their removal from the system at any time due to the fact that they have adsorbed enough moisture or water to become exhausted or spent and of no further use. Further, such dehydrators cannot be referred to as being capable of permanent installation. Silica gel dehydrators have been installed in refrigeration systems both in the high pressure or high side, which includes the compressor, condenser, and refrigerant expansion device and the liquid line, and in the low pressure or low side, which includes the evaporator and the suction line, the dividing line between the high and low side being the expansion device at one end and the discharge valve or valves of the compressor at the other end.

That refrigerant fluids and lubricants utilized in refrigeration systems do contain moisture or water, which interferes with the proper operation of said systems is well known. The effects of excessive moisture in refrigeration systems are several, namely, corrosion, freezing at the refrigerant expansion device, and formation of oil sludge.

As is well known, excessive moisture may be introduced into a refrigeration system by faulty piping, leaky seals, condenser leaks, evaporator leaks, presence of moisture on new parts introduced into the system, excessive moisture in the oil or refrigerant fluid, and during repair of system, the removal of tubing therefrom into a room where the air is warm and moist and the subsequent replacement of said tubing into the system, in which instance, the moisture condenses on the inside of the tubing. Frequently, after the repair of or part replacement in a system, the service man is recalled to replace the "chemical type" drier which has become exhausted or spent due to the excessive amount of moisture introduced into said system during the previous repair job.

The use of electrical precipitators for the removal of moisture from gases and even sulfuric acid mist from a stream of sulfur dioxide is well known in the art. In electrical precipitators there is set up and maintained an electrostatic field or corona discharge between a discharge electrode and a collector electrode, between which electrodes the gas bearing the entrained moisture and oil particles is caused to flow, if that be the case as in refrigerating systems. The moisture and oil particles, that being the case, become charged during passage through the electrostatic field and are attracted to the collector electrode, thus being separated from the gas. Either a high direct current voltage, or a high alternating current voltage may be impressed upon the discharge electrode, and the collector electrode may be connected to ground. Using a high direct current voltage, the charge impressed upon the discharge electrode may be of a negative potential or of a positive potential.

An object of this invention is to provide a refrigeration apparatus having therein an electrical precipitator utilized as a dehydrator or drier, said precipitator being free from any chemical moisture removing agent and being capable of permanent installation in said system.

A further object of this invention is to provide a novel type of electrical precipitator, free of any chemical moisture removing agent, to be used as a dehydrator in a refrigeration apparatus, wherein the petcock means, whereby moisture or water is removed from said precipitator, is utilized as an electrode means in said precipitator.

Another object of this invention is to provide a refrigeration apparatus having an electrical precipitator, free of any chemical moisture removing agent, to be used as a dehydrator therein, positioned in the low pressure side of the apparatus, between the refrigerant expansion device and the compressor, said low side including also an evaporator.

Still another object of this invention is to provide an assembly adapted to be used in a refrigeration apparatus comprising an electrical precipitation dehydrating means, a refrigerant expansion device, and a length of tubing between and connecting said precipitator and said expansion device, said precipitator being free from any chemical moisture removing agent.

A further object of this invention is to provide an assembly adapted to be used in a refrigeration apparatus comprising an electrical precipitation dehydrating means connected to an evaporator by means of a length of tubing.

Other objects and features of this invention will become apparent from the following detailed description.

Figure 4 is a view partly in section, and partly in elevation, of the electrical precipitation unit to be utilized in the low side of the system between the evaporator and the compressor.

Figure 5 is a horizontal section taken on line 5—5 in Figure 4.

Figure 6 is a vertical longitudinal view, partly in section, of another embodiment of an electrical precipitation unit to be utilized in the low side of the system between the evaporator and the compressor.

Figure 7 is a fragmentary perspective view of a portion of the precipitator of Figure 6.

Figure 8 is a view partly in section, and partly in elevation, of the electrical precipitation unit to be utilized between the condenser and the refrigerant expansion device, on the high side of the system, and/or the refrigerant expansion valve and the evaporator.

Figure 9 is a horizontal section taken on line 9—9 of Figure 8.

Figure 1:
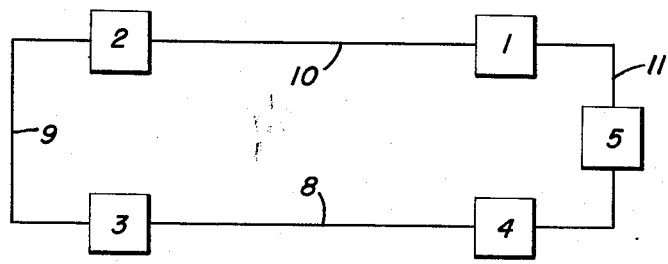
Figure 1 is a diagrammatic view of the refrigerating system having therein an electrical precipitator.
Figure 2:
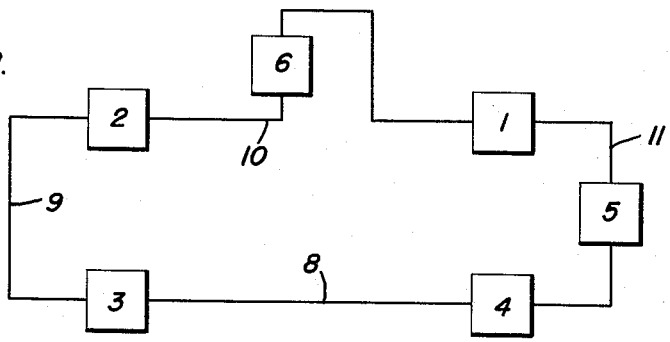
Figure 2 is a diagrammatic view of another embodiment of the refrigerating system.
Figure 3:
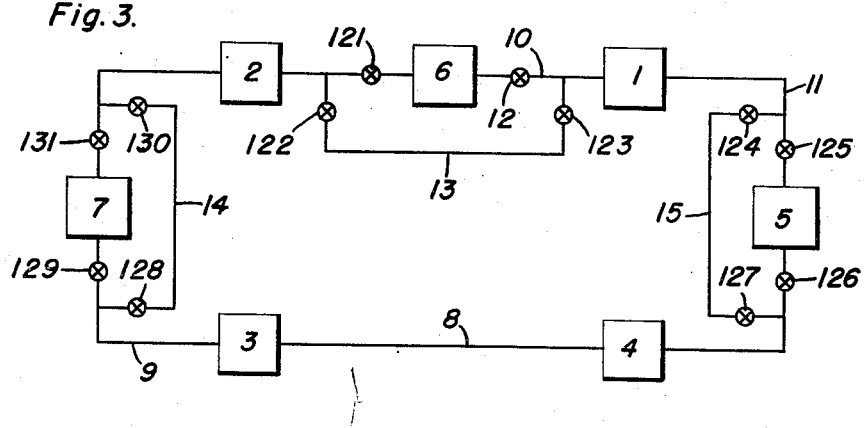
Figure 3 is a diagrammatic view of a third embodiment of the refrigerating system.

More specifically, the refrigeration apparatus comprises, in a closed cyclic path, as shown in Figures 1, 2, and 3, a compressor 4, a condenser 3, a refrigerant expansion device 2, and an evaporator 1, connected in series by means of conduits, preferably of copper, as shown in said figures. Generally, in a refrigeration apparatus, the refrigerant which leaves the evaporator 1 passes through the compressor 4 where it undergoes compression, then passes through the discharge conduit 8, then through the condenser 3, from which it emerges as a mixture of vaporous and liquid refrigerant fluid, then through the conduit, through the refrigerant expansion device 2, wherein the refrigerant fluid mixture is throttled and further expanded, then through the conduit 10, then through the evaporator 1, wherein the refrigerant fluid is further expanded, and from which it emerges as a vapor, then through the suction conduit 11, and finally back to the compressor to begin the cycle through the system again.

To describe further the operation of the refrigeration apparatus dichlorodifluoromethane, known in the art as Freon–12 or F–12, will be taken as an example of the refrigerant fluid. Water or moisture, present in a refrigeration apparatus, will render said apparatus inoperative if present in large quantities, and in many instances, no more than two or three grams of water in said apparatus will suffice. At present, the driers or dehydrators used in refrigeration systems are of the chemical type and require, as previously stated, replacement after the chemical, silica gel or alumina, has been exhausted or spent.

In the present invention an electrical precipitator is utilized as the dehydrator means and constitutes a permanent installation. Here, electrical precipitators can be placed in the system either on the high pressure or high side thereof, which includes the compressor, condenser, and expansion device, or on the low pressure or low side thereof, which includes the evaporator and the suction conduit. In Figure 1, an electrical precipitator 5 is shown between the evaporator 1 and the compressor 4, in the suction conduit 11. In Figure 2, electrical precipitators 5 and 6 are shown in the lines 11 and 10 respectively, on the low side of the system. In Figure 3, electrical precipitators 5, 6, and 7 are shown in lines 11, 10, and 9, respectively, 5 and 6 being on the low side and 7 on the high side, of the system. In Figure 3, there is shown bypass conduits 13, 14, and 15, having valves 122, 123, 128, 130, 124, and 127, respectively, placed therein, whereby the respective electrical precipitator driers, individually or collectively, may be operatively removed from the system, if the conditions existing therein so warrant. The electrical precipitators 5, 6, and 7 to be utilized in the conduits 11, 10, and 9, respectively, differ as to their respective structural components due to the physical state of the refrigerant fluid in each respective conduit of the system. In conduit 8, the refrigerant fluid is usually in the liquid state and is at its highest temperature while in the system. In conduit 9, the refrigerant fluid is usually a mixture of a small amount of vapor and a large amount of liquid as it emerges into the line 9 from the condenser 3, wherein the pressure and temperature are both reduced due to the extraction of heat from said refrigerant. In conduit 10, the refrigerant fluid is usually a mixture of about 10 percent vapor and ninety percent, by volume, liquid, as it emerges from the expansion device 2 into the conduit 10, and thence into the evaporator 1. In the conduit line 11, the refrigerant fluid is usually one hundred percent vapor. It is well known that water or moisture is relatively insoluble in Freon–12, the solubility of the water therein decreasing as the temperature of the Freon–12 decreases. It is well known that the solubility of water in Freon–12 is approximately two hundred parts per million at 100° F. and approximately sixty parts per million at 32° F.

Figures 4 and 6 each set forth electrical precipitators utilized as component 5 in Figures 1, 2, and 3.

The electrical precipitator of Figure 4 comprises a tubular body 16 of a plastic material such as Lucite having end caps 15, 15 fitted thereto as shown, said end caps having bosses 17, 17 therein. The bosses 17, 17 are threaded on the inner diameters thereof to receive flare fittings 18, 18, whereby the conduits are attached to said precipitators. Into the tubular body 16 is inserted a brass fitting 19, comprising a portion of the petcock means. Inside the tubular body 16 is inserted the plastic member 20. Member 20 has therein the circular bore 21 into which is inserted fitting 19, as shown in Figures 4 and 5. In said bore 21 is positioned the brass ball 22 and the brass spring 23, as shown. The diameter of 22 is slightly smaller than the diameter of the bore 21. Member 20 also has therethrough, as shown, the opening 24 into which copper tube 25, which may have perforations 61a therein, is inserted in the opening 26, as shown in Figure 4. The spring 23 is joined to ball 22 and to tube 25 to insure good electrical contacts. To make leakproof fittings, gaskets 27 and 28 are utilized, and the tube 25 bears a flange 29, as shown in Figure 4. A copper oxide coating 30 may be placed on the inner periphery of the tubular body 16 in such a manner that its upper portion 31 is at a point above the bottom portion of end cap 32 and its lower portion 33 is at a point above the surface of member 20. Attached to tube 25 by means of struts 34, 34 is baffle member 35. A high direct current voltage source 36 is electrically connected to member 19 by means of wire 37 and is connected to ground by means of ground connection 38. The end cap 15 is connected to the ground by means of ground connection 39. The precipitator shown in Figure 4 is employed in the refrigeration apparatus of Figures 1, 2, and 3 at 5, in the suction line 11, wherein the refrigerant fluid is in the vapor state.

Figure 6 shows another embodiment of an electrical precipitator utilized in the suction line 11, at 5, in the apparatus of Figures 1, 2, and 3. The precipitator here comprises the cylindrical body 40 of plastic material such as Lucite having end caps 41 and 42, each of brass, with bosses 43 and 44 and an opening 45 in which an insulating element 46 is mounted. In element 46 is embedded a conductor 47. End cap 41 is connected to ground through wire 45a. To 47 is connected conductor 48 from the high voltage source 49 which is connected to ground by means of ground connection 50. To conductor 47 is connected a relatively fine wire 51 which is anchored in the insulating block 58. Mounted within body 40 is member 53 comprising a dish 54, as shown in Figures 6 and 7, leaving tube 52, open at both ends, projecting upwardly therefrom. Depending from 53 at 55 is the tube 56 which terminates in the body at opening 57, at which point petcock 59 is attached. The wire 51 is anchored in insulator 58 which is attached to tube 52. The inner periphery of 40 is coated with a copper oxide coating 60, the topmost portion of which terminates at 61, which is above the lower portion 62 of end cap 41, and the bottom portion of which terminates at 63, which is above the point 64 of the dish 53. The dish 53, tube 52, and tube 56 are of plastic material.

The electrical precipitator of Figure 8 is utilized in the refrigeration apparatus of Figures 2 and 3 at 6 and 7 in lines 10 and 9, respectively. The precipitator here comprises a cylindrical tube 62 similar to 16 of Figure 1. Inserted in the upper portion of said tubular body 62 are copper flange members 63 as shown. In the lower portion of body 52 is a structure comprising members 19, 20, 22, and 23 as in the precipitator shown in Figure 4. Inserted in the opening 24 is the tapered copper tube 64, having a taper of approximately twenty degrees from the vertical. Flange members 63 are connected to ground by ground connection 69. Member 19 is connected to a high voltage source, which is connected to ground, as in the precipitator of Figure 4. Flange members 63 are an integral part of the outer cylindrical member 65, which is positioned as shown, joined to the body 62, which may be of a plastic material such as Lucite. All members are joined in such a manner, using customary gaskets and washers, that no leakage takes place at the joints in said precipitator.

The precipitators shown in Figures 4 and 6 are utilized in such a manner that the refrigerant fluid enters the respective precipitator at the top and leaves at the bottom. The precipitator shown in Figure 8 is utilized in such a manner that the refrigerant fluid enters the precipitator at the bottom and leaves at the top.

It is to be particularly noted that the physical state of the refrigerant fluid in the respective conduit lines may be varied in accordance with the results desired to be obtained from the operation of the refrigeration apparatus.

As previously stated and shown in Figures 1, 2, and 3, the refrigeration apparatus can have therein one or several electrical precipitators in operative working condition in one or several conduit lines at the same time, therein depending upon the amount of moisture present in the respective portions of the apparatus. Usually, after a repair has been made in the system which has required the opening of the various conduit lines to the atmosphere, it is necessary to have in operation electrical precipitators 5, 6, and 7. This can be accomplished by the proper manipulation of the valves in the conduit line and by-pass conduit line associated with the respective precipitator. For example, after the system has been closed following a repair job, said system is evacuated to remove substantially all of the air present therein. After evacuation of the system, the refrigerant fluid, taking as an example, Freon-12, is introduced into the system. Each electrical precipitator can be put into operation at any time thereafter to remove the water or moisture from the system. Particular attention is also directed to the fact that a relatively small amount, as compared to the refrigerant fluid, of lubricating oil, utilized in the compressor, is also passed through the system. The presence of this oil in the system will not affect the operation, in the absence of water, to any consequential degree, and it is desired to retain this oil in the system. That the oil possesses a specific gravity less than that of water and that Freon-12 possesses a specific gravity greater than that of water are to be noted. For example, at the start of the operation, the valves 12, 121, 122, 123, 124, 125, 126, 127, 128, 129, 130, and 131 are all in the open position. A high direct current voltage or a high alternating current voltage is impressed upon the discharge electrode of each respective precipitator 5, 6, and 7. In the precipitator shown in Figure 4 the discharge electrode includes the structure comprising the petcock means including the fitting 19, the ball 22, spring 23, and the tube 25, and the collector electrode comprises the top end cap 15 and the copper oxide coating 33. In the precipitator shown in Figure 6 the discharge electrode comprises the wire 51, and the collector electrode comprises the top end cap 41 and the copper oxide coating 60. In the precipitator shown in Figure 8 the discharge electrode comprises the petcock means and the tapered copper tube 64, and the collector electrode includes 65 and 63 which are grounded as shown.

As previously stated, either of the precipitators of Figures 4 and 6 can be utilized at 5 in Figures 1, 2, and 3, between the evaporator 1 and the compressor 4, where the refrigerant fluid is in a gaseous state. A high voltage, preferably between 6000 and 15,000 volts, is impressed on the discharge electrode means thus setting up an electrostatic field or corona discharge between the discharge and collector electrode means. The moisture and oil entertained in the refrigerant fluid, which is in a gaseous state, is attracted to the collector and flows downwardly onto the member 20 (Figure 4) or onto the dish 54 (Figure 6). The oil being lighter than the water rises to the top and the water goes to the bottom. The refrigerant fluid enters each type of precipitator at the top thereof. In the precipitator of Figure 4 the baffle member 35 prevents any of the moisture from entering tube 25, which phenomenon is very unlikely to take place, in any event. The oil, in each case overflows, through openings or perforations 61a (Figure 4), or the top of tube 52 (Figure 6). The water is drained from the precipitator through the petcock means in each instance.

At 6 and 7 of Figures 2 and 3, the precipitator shown in Figure 8 is utilized, since, in those respective parts of a refrigeration system, the greater portion of the refrigerant fluid will be in the liquid state. The refrigerant fluid carrying the moisture and oil enters the precipitator at the bottom thereof. A high potential, preferably between 6000 and 15,000 volts, is impressed upon the discharge electrode means, as in the precipitators of Figures 4 and 6 thus setting up an electrostatic field therebetween. The water and the oil will be attracted to the collector electrode and will be collected on member 20.

In all instances the moisture is removed from the precipitator by petcock means.

Further, in every case, the distance between the discharge electrode and the collector electrode is of such a value that no arcing is caused. These distances, of course, depend upon the size of the precipitator unit and the size of the refrigeration unit, and the determination of such distances is well within the skill of the art. Further, the oil, in each case, will act as an insulating medium. Also, the overall dimensions of the respective precipitators and the components thereof will depend upon the size of the system.

As previously stated, the precipitators can be operatively disconnected from the system by means of the valves shown in the lines adjacent said precipitators, or the systems may be initially constructed as shown in Figures 1, 2 and 3.

Further, in all cases, the precipitators should be well insulated from the surrounding medium in order to prevent a change in temperature of the fluid passing therethrough. It is to be noted that in each case as the fluid enters the precipitator, there will be a decrease in pressure due to its passing from a conduit smaller in diameter than the diameter of the precipitator body, thus bringing about a decrease in temperature, and a decrease in the solubility of the water or moisture in the refrigerant fluid. Also, the voltage impressed can be of a negative or positive potential and the voltage can be a high direct current voltage or a high alternating current voltage.

The refrigerant expansion device and the electrical precipitator can be formed in a single unit together with the conduit connecting said components. Because a dehydrator comprising an electrical precipitator is used in combination with said expansion device, the life of the latter is lengthened due to the fact that the said dehydrator is free from any chemical moisture removing agent and thus is not disassembled at any time in order to be refilled. Thus less moisture will be introduced into said expansion device and thus the repair of same will not be required due to breakdown because of corrosion and plugging due to moisture being introduced therein. Likewise, the evaporator and the electrical precipitator can be formed into a single unit together with the conduit connecting said components.

From the foregoing subject matter, it is seen that I have provided a refrigeration apparatus utilizing a dehydrator capable of permanent installation. There is no chemical moisture removing agent to be replenished due to an excess of moisture adsorbed thereby. I have set forth refrigeration apparatus whereby substantially all of the moisture and other particles of foreign matter, such as dirt, can be removed therefrom. It is to be particularly noted that the physical state of the refrigerant fluids such as Freon-12 and methyl chloride can be changed from liquid to vapor, and vice versa, by changing the pressure and temperature conditions of the systems confining same, here, refrigeration systems, and that thus the solubility of the moisture therein can be likewise changed. Therefore by proper manipulations of the system components, the physical state of said refrigerant fluids can be varied, and the electrical precipitator, as described above, suitable to remove the moisture from said refrigerant fluid in such physical state and at the temperature and pressure thereof, can be utilized.

Many alterations and changes can be made without departing from the spirit and scope of this invention which is set forth in the appended claims which are to be construed as broadly as possible in view of the prior art.

I claim:

1. A refrigeration apparatus having as its component parts a compressor, a condenser, a refrigerant expansion device, an electrical precipitator, an evaporator, and a second electrical precipitator, each of said component parts being in series in a closed cyclic path, and a refrigerant fluid in said apparatus, each of said electrical precipitators being used as a dehydrator avoiding the requirement for any chemical moisture removing agent, whereby said refrigeration apparatus has therein permanently installed dehydrators.

2. A refrigeration apparatus having as its component parts a compressor, a condenser, an electrical precipitator, a refrigerant expansion device, a second electrical precipitator, an evaporator, and a third electrical precipitator, each of said component parts being in series in a closed cyclic path, and a refrigerant fluid in said apparatus, each of said electrical precipitators being used as a dehydrator avoiding the requirement for any chemical moisture removing agent, whereby said refrigeration apparatus has therein permanently installed dehydrators.

3. A refrigerating apparatus having as its component parts a compressor, a condenser, a refrigerant expansion device, an evaporator, and an electrical moisture precipitator in series in a closed cyclic path, and a refrigerant fluid in said apparatus, said precipitator having a valve means therein connecting the inner portion thereof to the atmosphere for removal of the collected moisture therefrom, said precipitator avoiding the requirement for any chemical moisture removing agent, whereby said refrigerating apparatus has therein a permanently installed dehydrator.

4. A refrigerating apparatus comprising a compressor, a condenser, a refrigerant expansion device, an evaporator, and an electrical moisture precipitator connected in series in a closed cyclic path in the order named, said precipitator avoiding the requirement for any chemical moisture removing agent therein, whereby said refrigerating apparatus has therein a permanently installed dehydrator.

References Cited in the file of this patent

UNITED STATES PATENTS

| Number | Name | Date |
|---|---|---|
| 992,829 | Weston | May 23, 1911 |
| 1,555,231 | Skaer | Sept. 29, 1925 |
| 1,580,591 | Eddy | Apr. 13, 1926 |
| 1,871,546 | McClofferty | Aug. 16, 1932 |
| 2,073,952 | Shepherd | Mar. 16, 1937 |
| 2,190,138 | Smith et al. | Feb. 13, 1940 |
| 2,365,526 | Dean | Dec. 19, 1944 |
| 2,372,314 | Canetta | Mar. 22, 1945 |
| 2,430,692 | Touborg | Nov. 11, 1947 |

FOREIGN PATENTS

| Number | Country | Date |
|---|---|---|
| 363,902 | Great Britain | Dec. 31, 1931 |